United States Patent [19]

Hochbrueckner

[11] Patent Number: 6,155,160

[45] Date of Patent: Dec. 5, 2000

[54] PROPANE DETECTOR SYSTEM

[76] Inventor: Kenneth Hochbrueckner, 85-12 115$^{th}$ St., Richmond Hill, N.Y. 11418

[21] Appl. No.: 09/325,361

[22] Filed: Jun. 4, 1999

Related U.S. Application Data

[60] Provisional application No. 60/087,946, Jun. 4, 1998.

[51] Int. Cl.$^7$ ............... A23L 1/00; G01N 7/00; G01N 21/61
[52] U.S. Cl. ............... 99/331; 99/337; 99/342; 99/344; 126/112; 126/39 R; 126/41 R; 250/339; 250/343; 340/632
[58] Field of Search ............... 99/325–333, 337, 99/338, 342–344, 400, 401, 444–450; 73/23.2, 31.05; 122/448.1, 504; 126/112, 39 R, 41 R, 116; 250/343, 351, 339, 345, 339.13, 339.04, 43.5, 338.5; 307/118, 140, 683; 340/632, 634, 628–630; 422/90, 98, 83, 88; 431/76, 22; 432/36

[56] References Cited

U.S. PATENT DOCUMENTS

| | | |
|---|---|---|
| 3,662,171 | 5/1972 | Brengman . |
| 3,778,798 | 12/1973 | Heit ..................... 340/632 X |
| 3,815,113 | 6/1974 | Welch ................... 340/632 X |
| 3,861,809 | 1/1975 | Hall . |
| 3,955,186 | 5/1976 | Green et al. ............... 340/634 |
| 4,164,539 | 8/1979 | Johnston . |
| 4,224,280 | 9/1980 | Takahama et al. ........... 422/98 |
| 4,323,777 | 4/1982 | Baskins et al. . |
| 4,437,005 | 3/1984 | Ophoff . |
| 4,489,239 | 12/1984 | Grant et al. . |
| 4,500,207 | 2/1985 | Maiden . |
| 4,560,875 | 12/1985 | Crowder . |
| 4,567,366 | 1/1986 | Shinohara . |
| 4,580,439 | 4/1986 | Manaka . |
| 4,614,669 | 9/1986 | Yannopoulous . |
| 4,647,777 | 3/1987 | Meyer . |
| 4,694,174 | 9/1987 | Erath . |
| 4,709,150 | 11/1987 | Burough et al. . |
| 4,853,543 | 8/1989 | Ozdemir . |
| 4,862,147 | 8/1989 | Thomas ................... 340/628 |
| 4,869,233 | 9/1989 | Stulen et al. .............. 126/39 R |
| 4,871,916 | 10/1989 | Scott . |
| 4,899,053 | 2/1990 | Lai et al. . |
| 4,916,437 | 4/1990 | Gazzaz . |
| 4,958,076 | 9/1990 | Bonne et al. . |
| 5,003,812 | 4/1991 | Yagawara et al. . |
| 5,012,671 | 5/1991 | Yagawara et al. . |
| 5,026,992 | 6/1991 | Wong . |
| 5,070,244 | 12/1991 | Simpson . |
| 5,096,116 | 3/1992 | Akamatu et al. ........... 99/331 X |
| 5,218,347 | 6/1993 | Deppe . |
| 5,250,170 | 10/1993 | Yagawara et al. . |
| 5,372,785 | 12/1994 | Johnson et al. . |
| 5,379,026 | 1/1995 | Whittle . |
| 5,398,597 | 3/1995 | Jones et al. ............... 99/331 |
| 5,444,249 | 8/1995 | Wong . |
| 5,464,983 | 11/1995 | Wang . |
| 5,475,222 | 12/1995 | King . |
| 5,608,219 | 3/1997 | Aucremanne . |
| 5,637,872 | 6/1997 | Tulip . |
| 5,650,024 | 7/1997 | Hasegawa et al. . |
| 5,650,624 | 7/1997 | Wong . |
| 5,709,222 | 1/1998 | Davallou . |
| 5,712,481 | 1/1998 | Welch et al. . |
| 5,721,430 | 2/1998 | Wong . |
| 5,753,797 | 5/1998 | Forster et al. . |
| 5,780,715 | 7/1998 | Imblum . |

(List continued on next page.)

*Primary Examiner*—Timothy F. Simone
*Attorney, Agent, or Firm*—Milde, Hoffberg & Macklin, LLP

[57] ABSTRACT

An electronic control for a grill, providing enhanced functionality and safety features. A hydrocarbon detector system provides an intermittently operated electro-optic device emitting photons at a wavelength which selective interacts with hydrocarbon as compared to air, associated with a detector for detecting the selective interaction and an alarm monitor for detecting an alarm state. A food temperature sensor is employed to proportionately control combustible fuel flow rate, to thereby control a food temperature profile. A communications network interface is provided to allow remote control and monitoring.

20 Claims, 3 Drawing Sheets

U.S. PATENT DOCUMENTS

| | | |
|---|---|---|
| 5,785,512 | 7/1998 | Cormier . |
| 5,793,295 | 8/1998 | Goldstein . |
| 5,797,358 | 8/1998 | Brandt et al. . |
| 5,807,098 | 9/1998 | Deng . |
| 5,813,394 | 9/1998 | Clifford . |
| 5,822,058 | 10/1998 | Adler-Golden et al. . |
| 5,828,307 | 10/1998 | Washer . |
| 5,879,631 | 3/1999 | Wewers et al. . |
| 5,933,245 | 8/1999 | Wood et al. . |

PROPANE DETECTOR SYSTEM

This application claims the benefit of U.S. provisional application No. 66/087,946, filed on Jun. 4, 1998.

FIELD OF THE INVENTION

The present invention relates to the field of safety devices, and more particularly to propane detector systems for use in conjunction with domestic propane tanks. Compressed combustible gas tanks pose a potentially serious hazard, which can be ameliorated by detecting leakage before the gas reaches an explosive concentration.

BACKGROUND OF THE INVENTION

Compressed propane is often used as a convenient heating and cooking fuel. It can be transported in refillable tanks, or delivered by truck to stationary tanks. In many instances, the necessary valves and couplings pose a potential leakage hazard. If leakage is sufficient, propane gas, which is heavier than air, can accumulate and mix with the air, forming an explosive mixture. A propane tank must not be filled above capacity, normally 80% of volume, in order to accommodate thermal expansion of the gas and liquid in the tank. Approved tanks each include a pressure relief valve, which allows escape of propane in the event of overfilling, avoiding the risk of rupture of the tank with release of all of the propane. However, these relief valves themselves release propane into the atmosphere, which may reach dangerous levels. The risk of overfilling is increased in the case of transportable propane tanks, e.g., D.O.T. approved 20 lb. tanks. There therefore remains a need for a system to detect propane leakage around propane tanks, to provide an alert of the potential hazard.

A large number of explosive gas detectors and propane detectors are known. Available types, fall into four general categories:

1. calorimetric analysis of sample gas
2. photometric analysis of sample gas
3. semiconductor detectors
4. laboratory, chemical and other detectors A calorimetric detector seeks to determine the functional presence of combustible gasses by oxidizing any such gases present, and measuring the "excess heat" generated. These detectors, for example, employ a heated catalytic bead and non-catalytic head disposed on legs of a platinum resistance thermometer, measuring the differential bridge voltage due to the flammable gas induced heating of the catalytic bead with respect to the non-catalytic bead. New technologies allow micromachined devices to serve as combustible gas detectors, for example so-called microcanteliever devices developed by Oak Ridge National Labs.

A photometric gas detector seeks to detect the presence of gas by a signature pattern, for example the spectrographic characteristics of the gas. Typically, the characteristic absorption peaks of hydrocarbon gasses fall in the infrared range. The photometric characteristics of a gas may be measured locally, in a detector space, or remotely, such as by remote laser sensing techniques.

A semiconductor detector operates by selectively or semiselectively absorbing the gas to be measured to a semiconducting material, and measuring an alteration in the conductive properties of the semiconducting material. Typical semiconductors include tin oxide, lathough a number of other semiconducting materials may also be used. Semiconducting detectors typically have low selectivity, and respond to a broad range of gasses, for example lower hydrocarbons and alcohols, carbon monoxide, hydrogen sulfide, and other gasses.

Lastly, there are a number of specialty detectors, for example those used in laboratory analyses, color change detectors, mass spectroscopy, and the like, which may also detect gasses.

In a domestic environment, propane gas is used to provide heat, for cooking, and for barbecues. While some types of detectors are available which will detect leaking propane, their use is limited, especially in uncontrolled environments. Thus, the available domestic flammable gas detectors are intended for permanent mounting, continuous operation and line current operation.

Propane tanks for domestic barbecues are typically refilled and transported. U.S. Department of Transportation (D.O.T.) regulations carefully describe the construction and features of these tanks, in order to ensure safe transport. These tanks are each provided with a safety relief valve, near the main valve, which vents in the event of overpressure. Propane tanks for barbecues are approximately 18" high and 12" diameter, with a valve system centered on the top surrounded by a handle/protective cage about 270°. The valve handle extends upward, below the upper extent of the handle/protective cage, and has a nozzle which projects at right angles toward the open portion of the handle/protective cage. The handle/protective cage has three openings, a larger of which serves as a handle. The base of the tank includes a conic section between a spherical lower portion of the tank and the ground.

Typically, the sensing system used in distributed combustible gas detectors includes an electronic sensor detecting the presence of combustible gas, such as a heated sensor with a flame arrestor, forming an "intrinsically safe" module (i.e., low probability that the detector may itself ignite the propane). An alternate type of sensing system employs a semiconductor which responds to the presence of various Lyases, such as propane. For example, Motorola Senseon MGS-1200 sensor, Figaro TGS2612, Figaro TGS 813, English Electric Valve (EEV) heated catalytic bead combustible gas sensor, or similar types may be used.

Carbon monoxide is a normal product of propane combustion, and in closed environments, this may also become a hazard. Known carbon monoxide sensors include the Figaro TGS2440. Figaro TGS800 and Motorola Senseon MGS-1100. The later two sensors have marked cross sensitivity with propane, and thus may be used to detect both hazards, but cannot alone distinguish them. Carbon monoxide is typically sensed with semiconductor-type sensors or electrochemical detectors.

As a result of the permissible characteristics, including allowable power consumption, warm-up time and other constraints, installed domestic sensors can easily employ sensors with moderate or high current consumption, long warm-up stabilization time and bulky size. Known portable personal safety devices also employ these types of sensors: however the systems provide a limited battery life and may be relatively heavy due to the batteries necessary to run the integral sensor heaters.

Heated sensors, such as the Senseon series of gas detectors, are micromachined and employ an element covered with a catalytic material, which is electrically heated. For example, a Senseon MGS 1200 type device employs a tin oxide film. The temperature of the sensor is measured, for example as compared to a like sensor element absent the catalyst.

These semiconductor sensors may also be used to detect combustible gasses. In the MGS 1200, propane interacts with the heated catalyst to alter its conductivity. In other systems, the degree of temperature rise of the catalytic element is related to the amount (caloric content) of combustible gas present.

Catalytic and semiconductor sensors may require long stabilization times, in order to eliminate non-specific absorption to the catalyst or other interfering influences.

Thus, The following U.S. Patents, as well as references cited therein, incorporate herein by reference, relate to gas detection and associated technologies: U.S. Pat. Nos. 5,879,631; 5,828,307; 5,807,098; 5,797,358; 5,709,222; 5,650,024; 5,379,026; 4,709,150; 4.437,005; 4,323,777; 5,721,430; 3,662,171; 5,444,249; 5,608,219; 5,070,244; 5,464,983; 4,916,437; 4,694,174; 4,560,875; 5,475,222; 3,861,809; 5,026,992; 4,647,777; 4,567,366; 4,958,076; 4,500,207; 4,899,053; 4,489,239; 4,871,916; 4,853,543; 5,637,872; 5,372,785: 5,250,170; 4,580,439; 5,012,671; 5,003,812; 4,164,539; 5,218,347; and 4,614,669.

U.S. Pat. No. 5,813,394, expressly incorporated herein by reference, relates to a cooking grill with a flame detector, for relighting the flame if blown out and providing automatic shutoff.

SUMMARY OF THE INVENTION

The present invention provides a combustible gas detector system for use in domestic environments, and in particular proximate to propane tanks.

The detector system has low power consumption, and is suitable for extended operation in relatively unprotected environments. In pulse operation mode, a preferred embodiment has a short stabilization time, allowing substantial power savings over a continuous operation system. Thus, the system may be used in remote locations with low maintenance.

Typically, propane tanks are housed outdoors, or in non-enclosed environments. This is because, in the event of a leak, an explosive mixture easily forms with air which can result in catastrophic explosions. Propane gas is dense, and therefore does not dissipate easily. Thus, effective flammable gas detectors must be located near the tank and/or below it.

Even when stored in the open, gas leaks are hazardous. However, heretofore no system has been designed to particularly address detecting the hazards of domestic propane storage.

The present invention therefore provides a detector suitable for battery operation over extended periods, which accurately detects propane leakage with high sensitivity and specificity, preferably without substantial susceptibility to false positive alarms and which does not itself present an explosion hazard in the event of leakage. In order to provide prolonged battery operation, portions of the device are preferably powered intermittently, employing a sensor which requires a short settling (stabilization) time for accurate measurements.

The preferred detection technology is a photometric detector, and more particularly a detector detecting the presence of gasses having a specific characteristic absorption of infrared light at one or more wavelengths in the bands 3000–2700 $cm^{-1}$ and/or 1475–1300 $cm^{-1}$. These wavelengths are relatively specific for the C—H bond stretch and bend, respectively.

In detecting this absorption, a narrowband infrared light emitting semiconductor structure, such as a light emitting diode or laser diode, may be used. Alternately, a filtered broadband light source or narrowband detector may be used.

The most common interfering gasses are carbon dioxide, carbon monoxide and other combustion products, which may be the result of the normal use (combustion) of the propane. One option is to provide non-selective detection of multiple potential hazards simultaneously. Alternately, the sensor or multiple sensors may be operated to distinguish the various gasses.

In a preferred embodiment, propane is detected optically. An optical absorption (or other wavelength specific photon interaction) of a gas sample is detected at at least a first wavelength wherein the gas of interest has a specific absorption, preferably at an absorption maxima or at a wavelength which best distinguishes the gas of interest from potentially interfering gasses. In order to compensate for detector baseline drift and offset, changes in sensitivity, temperature variations, and the like, a second optical absorption (or other wavelength specific photon interaction) of a gas sample under similar circumstances to the first measurement is obtained, at an optical wavelength which has a different optical characteristic, preferably a low specific optical absorption. For example, a single silicon detector is illuminated by two infrared light emitting diodes, one having a wavelength corresponding to a peak absorption or propane and another corresponding to low absorption by air and/or air mixed with propane. The differential output from the two illumination conditions for normal air is stored as an offset, and measurements of sample gas taken intermittently thereafter. Since the sensitivity of a temperature compensated detector is likely less sensitive to environmental variations and stabilization time than the offset, this technique will allow relatively long periods between samples, prolonging battery life. Intermittent in this case means, for example, a duty cycle of 0.1% or 0.01%, with short measurements taken every 0.5 to 5 minutes. In order to compensate for gain drift, cuvettes of clean air and known sample gas may be selectively disposed along the optical path (e.g., by repositioning a mirror, or providing two nearly identical optical sources and a single detector), with the differential between the two used to calibrate the detector for an unknown sample. In known manner, multiple wavelength measurements may be provided for increased detector performance.

U.S. Pat. No. 5,822,058, expressly incorporated herein by reference, discloses an optical spectrometric system for measurement of hydrocarbon fuel gas in a supply line. This technology may also be adapted for measurement of dilute propane and other combustible gasses according to the present invention. U.S. Pat. No. 5,793,295, expressly incorporated herein by reference, also discloses an optical gas detection system which may be useful as a part of, or in conjunction with other elements according to the present invention.

U.S. Pat. No. 5,753,797, expressly incorporated herein by reference, relates to a photoacoustic gas sensor adapted for detecting combustible gasses including concentrations which pose an explosive hazard.

Thus, a key feature according to a preferred embodiment of the present invention is that the sensor has low sensitivity to temperature variations, or these variations may be predicted and compensated. Thus, the optical system may reach operating conditions immediately or after a very short warm-up time. As necessary, real-time calibration or differential measurements may be used to maintain system accuracy.

In this manner, the system may operate analogously to known smoke detectors. which intermittently seek to detect increased optical absorption from smoke particles or the presence of ionizable particles in the air. By providing a duty cycle of less than 0.1%. battery life of months or years may be obtained from a single commercially available battery, e.g., a 9V transistor-type battery.

Laser diodes hold promise as intrinsic gas detectors because the presence of an absorptive gas in the laser cavity may alter a lasing threshold, produce a measurable fluorescence, or allow wavelength specific absorption measurements. Thus, one embodiment provides an integrated optical detector which includes a resonant laser cavity having an air space, through which sample gas passes or a special detector surface which has optical properties which alter in response to a propane concentration in a gas space. The laser has a mode which corresponds to an excitation wavelength or absorption peak of propane. Therefore, the laser resonance, especially the startup transient, will be altered by the presence of propane in the gas space. By analyzing the transient or absorption, the amount of propane may be determined accurately. In a related embodiment, the propane itself may form part of a laser system. In this case, the detection may employ one or more optical wavelengths. It should be understood that ion various embodiments, the propane may either extinguish the laser resonance or increase it, in the manner of a laser dye.

While the static characteristics of the electro-optical system may be measured, this is not preferred for two reasons. First, the static operation measurements typically require the component to be powered for a longer period of time, hence drawing more power, and second the optical excitation may itself alter the propane concentration in the gas.

Advantageously, the detector according to the present invention is physically associated with a propane tank, for example, being located on or in a cover thereof. This proximity increases the concentration of propane present at the detector in the event of leakage from the tank, thus lowering the required inherent sensitivity for reliable operation. In addition, it is generally desirable that the sensor detect the highest local concentration of combustible gas, in order to best judge the explosive hazard. The cover, for example may be a polyvinyl chloride sheet that is fabricated to conform the upper exterior profile of a portable tank, such as is used for barbecues.

In a barbecue environment, the gas detector system may be integrated into a more complex multifunctional system. This system detects combustible gasses, producing an alert if above a threshold level, for example due to valve leakage, mechanical defect, or overpressure relief. The alarm will also alert the user of a flame out or non-start condition of the barbecue. In the later case, it might be hazardous to ignite the propane if the environment is flooded with gas in explosive proportions.

The system may also include sensors for remaining propane level, barbecue temperature, food temperature, and other data. An audio transducer near the propane tank valve may be monitored for turbulent noise, indicative of barbecue operation.

Inadequately cooked foods are a known health hazard. On the other hand, overcooked foods on a grill may contain excess quantities of potential carcinogens, reduced nutritional value, and impaired taste and texture. Therefore, it is desired to optimize the cooking time and temperature of foods on a grill. By providing an intelligent electronic system, food core temperature may be monitored to determine cooking status, and provide an indication thereof to the chef. These may be wired temperature sensors, such as thermistors or semiconductor diodes, or even wireless transponders that relay temperature to an electronic interrogation system. A wireless transponder may be, for example, a surface acoustic wave device or active semiconductor device. The temperature sensor is, for example, inserted in the middle or core of the food. Advantageously, a more complex sensor may be provided to detect a temperature profile through the food. For example, it is desired that the core temperature of "well done" meat be at a certain minimum temperature, while the periphery should not be burnt. Therefore, by detecting the temperature profile, the cooking temperature as well as time may be controlled and optimized to the cooking preferences of the individual, and to compensate for variations in cooking conditions across the grill.

The sensor system preferably has audible and visible alarms. For example, the audible alarm is a piezo-electric transducer, driven near a resonant frequency with a modulated waveform. The visible alarm is, for example, a high brightness LED.

A particularly hazardous product of propane combustion is carbon monoxide. While normally this dissipates, when operated indoors or under poor ventilation, a hazardous amount may be present. Therefore, a carbon monoxide detector may also be integrated with the propane detector to detect and warn of this condition. While the cross sensitivity of a sensor may be exploited to detect both hydrocarbons and carbon monoxide, the differential sensitivity is not easily controlled, and therefore the respective alarm levels may be inappropriate. In addition, the "normal" carbon monoxide level will vary depending on whether the barbecue is in operation and the proximity and orientation of the detector to the burner.

Advantageously, therefore, where the primary hydrocarbon sensor has cross sensitivity to carbon monoxide, an auxiliary sensor, such as an electrochemical sensor (cyclic voltammetry or static potential reducing species detector) or semiconductor sensor may be provided to differentiate the carbon monoxide from the hydrocarbon. In another embodiment, when the optical detector detects an abnormal condition, a secondary, and more power consuming sensor, is activated to make a second, more selective, measurement.

In another embodiment, the sensor detects whether a flame is present in the burner, and adjusts its mode of operation accordingly; where there is no flame, the system operates at high sensitivity to detect gas leakage, and in the presence of a flame sensitivity is lowered to allow normal operation without alarm ennuciation.

Advantageously, an electronic detector system may also encompass a tank level gage as well. In this case, a set of temperature sensors, for example silicon bipolar devices (e.g., diodes or transistors), thermistors, thermocouples, or the like, are provided in a vertical arrangement near the wall of the tank. As the propane is used, the liquid propane in the tank will self-cool, forming a temperature transition line at the liquid/gas interface within the tank. A series of discrete sensors, or a single sensor strip may also be provided which changes in characteristics at the temperature change point, arranged vertically along the wall of the tank, may be used.

In order to indicate the level, a visible indicator, for example an LCD (liquid crystal display) bar graph display, may be provided in the electronic system, which typically is nested next to the valve and protected by the protective rim of the tank.

A set of visual indictors, for example pulse width or selectively modulated LEDs, may be provided on a vertical strip, for example adjacent to the sensors, which are illuminated to indicate the liquid level in the tank. For example, a piezo electric transducer, possible the same element as an audio alarm, is employed as a microphone. When a sound having particular characteristics is sensed, for example a clap, whistle, voice, or the like, the LED's may be illuminated for a period, for example with a 2% duty cycle, 30 Hz repetition for about one half a second. The pulsing of the LEDs is advantageous in that it improves the efficiency of LED driving from a 3V (or higher voltage) battery and provides improved perception, while limiting power draw. The LED's may be bicolor LED's, e.g., red and greens with those above the level red, those below the level red, and that at the level yellow (bipolar excitation). Alternately, the one LED at the level may be illuminated or those below the level illuminated. These functions are typically defined in the software of a microcontroller which controls the electronic system.

According to a different embodiment, tile level gage operates by other than temperature change height. For example, an active transducer may be used to measure the thermal capacitance of the tank wall, which changes at the liquid height. Thus, a set of small constant power heaters are provided which heat the wall by a small amount, e.g., about 2° C. The time to heat or relaxation time to the ambient temperature is measured. The liquid will cool the wall faster than the gas above the liquid-gas interface.

An acoustic sensor or acoustic sensor array may be used to produce acoustic waves, which characteristically differ based on the liquid level. For example, one or more piezoelectric elements rest against the tank wall. One or more elements of the array are excited, for example in a pulse or chirp waveform, and one or more of the piezoelectric sensors is monitored for a received acoustic waveform. Due to the differences in the acoustic properties of the liquid with respect to the gas, the sensors will have outputs which distinguish a liquid level. Alternately, an acoustic transducer excites wave in the wall of the tank, which travels down the side the tank. At the liquid level, an impedance mismatch occurs and a portion of the wave is reflected. The characteristic timing of the reflection is determined, as is well known in the field of time domain reflectometry. The sensor control may be, for example, an adaptive control, and thus need not be separately calibrated for every tank.

In one embodiment, the electronic systems include a networking device, for example a TCP/IP based communications interface, for communicating with other devices in tile environment, or remotely. For example, the microprocessor may include a so-called embedded "web server" to communicate sensed conditions and to respond to received commands or requests for information. Of course, the controller need not itself implement these protocols, and may communicate with a translation or bridge device using another protocol. Therefore, the device may be integrated with other domestic electronics systems and communicate therewith. Various known physical link layers may be employed, such as 10 Base T, 10 Base 2, phone-line networking, AC power line networking, RF communications (e.g., 24 MHz, 49 MHz, 900 MHz or 2.4 GHz), infrared communications (e.g., IRdA), acoustic communications, or the like. In order to reduce power consumption, a wireless communication system preferably provides at least two modes of operation, an active mode wherein the communications latencies are short, and a low power mode wherein the communications are shut down or operated with long latencies. The system may switch between modes automatically or on external command.

As stated above, the combustible gas sensor is preferably an infrared optical absorption sensor. This sensor detects a specific characteristic absorption of infrared light at one or more wavelengths in the bands 3000–2700 cm$^{-1}$ and/or 1475–1300 cm$^{-1}$. These wavelengths are relatively specific for the C—H bond stretch and bend, respectively. While these bands do have a number of possibilities for interference, the occurrence of such interferences are not normally occurring, and an alarm condition caused by the presence of interfering compositions would not defeat the usefulness of the system. Further, the detection system according to the present invention is intended to detect relatively high concentrations of hydrocarbons, so slight interference can typically be tolerated.

In order to detect these wavelengths, an infrared detector is employed. Typically, these detectors have an output which varies with temperature, and perform better (have higher signal to noise ratio) at reduced (sub-ambient) temperatures. However, a number of known methods may be employed to achieve adequate sensitivity at ambient and uncontrolled temperatures.

It is understood that there are two theories for setting a detection threshold for propane. The first deals with the explosive hazard. In order for propane to cause an explosive hazard, it must be present in excess of the lower explosive limit, about 3–4%. In order to provide a safe margin, a threshold may be set at 25% of lower explosive limit, or about 1%, which translates to 10,000 ppm, clearly a substantial concentration. The detector according to the present invention is typically directed toward the detection of explosive hazards. The detector may also be useful for detecting leaks, which in and of themselves may not pose an explosion hazard, but are nevertheless undesired. Since propane use may normally lead to some atmospheric leakage, the threshold must be set above background and contamination levels, for example 100–500 ppm. Of course, the measurements must be taken at an appropriate location, and since propane is normally denser than air, the sensor should be in a dependent location from the storage tank and hoses for maximum reliability.

The irradiation source of the optical sensor may be a broadband source, such as an incandescent bulb, or a narrow band emission source, such as a light emitting diode or semiconductor laser, e.g., in the 1475–1300 cm$^{-1}$ band. Preferably, the system operates as a differential infrared absorption detector, for example with a first measurement at 1300 cm$^{-1}$ and a second measurement at 1425 cm$^{-1}$, employing a single detector and two excitation sources, e.g., a broadband source with a pair of narrow-band optical filters, for example operating in an optical chopper configuration, two light emitting diodes at different wavelengths. Alternately, a reference gas and sample gas form the basis for the two measurements with simultaneous or sequential measurement of optical absorption.

Alternately, a wavelength sweeping irradiation source may be used. Typically, such sources employ a broadband source with a diffraction grating filter. However, such devices are generally more costly than desired for a system according to the present invention. Therefore, the wavelength shift on warming up, such as (generated in light emitting, (diodes, may be used to excite the detector. For example, an infrared light emitting diode at ambient temperature (20° C.) has a wavelength of 1400 cm$^{-1}$. When warmed, for example by pulsing a current of 30 mA for a short period, the diode may be heated to 65° C. or higher. At this temperature, the output wavelength in creases, for example to 1425 cm$^{-1}$. Since propane (or other hydrocarbons) have a high extinction coefficient in this range, any significant differential absorption, as measured by a change in detector output, would indicate the presence of such a gas. Thus, a usable system is provided by operating an infrared diode in pulse operation, detecting a differential signal as the diode is heated. The requirement that the diode cool between readings is not a disadvantage, since the system is intended to operate intermittently to conserve battery power.

In any case, the infrared absorption or differential infrared absorption is detected, and compared to an alarm threshold reading. The processor may also implement a so-called adaptive baseline, to correct for normal variations in the characteristics of the system over time and varying environmental conditions. In this case, the system presumes that hazardous conditions tend to occur quickly, for example over minutes, while baseline shifts occur slowly, over hours. Therefore, slowly varying signals are subtracted from the reading, so rapid changes are more readily detected. Of course, the system is preferably separately temperature compensated, because temperature changes may occur rapidly, for example due to changing shadows and the local heating from operation of a barbecue.

The system may also be calibrated by the use of a propane source, and so-called "zero gas", a known contaminant-free gas supply. This zero gas may, for example, be approximated by electrolytic oxygen, although quantities must be very limited to reduce fire or explosion hazard from this process.

When a super-threshold concentration of hydrocarbon (propane) is detected, an audible alarm is sounded and a visual alarm may be projected. These alarms may become intermittent after a period, to avoid wasting the remaining battery power if there is no action taken to silence it. A battery life detector is also preferably integrated in the system and determined with each measurement.

A carbon monoxide sensor may be provided which is, for example, also an infrared sensor, for example in the 1900–1650 $cm^{-1}$ band, or a semiconductive sensor which selectively changes impedance with carbon monoxide concentration, such as a Senseon MOIGS 1100 type device.

An acoustic sensor, such as a microphone or piezoelectric element may be provided to determine whether the propane tank is in use or not, a use condition generally being associated with some turbulence induced noise in the valve. A separate flame detector, which may be a heat sensor, infrared or other optic flame detector, or other type, may also be provided.

A tank level indicator may be formed as a linearly disposed array of silicon diodes, for example 1N914 type. These diodes are held in thermal communication with the tank, for example by a viscous grease or temporary adhesive. The diodes are relatively matched, so that a change in temperature will result in a measurable change in characteristics. The diodes have a known temperature response characteristic, and thus the temperature at each diode may be measured. The tank level is determined by the point in the array at which a significant temperature change occurs. Such significant temperature changes will be seen while the tank is in use, and the propane in the tank evaporating. When there is no temperature change, such as with an empty or inoperative tank, a heating strip may be provided over the sensing diodes which heats the wall of the tank by a small amount. This temperature change is sufficient to produce a significant response in the temperature sensing elements. The heater excitation is then stopped, and the temperature sensors monitored. Liquid propane through the wall will cool the wall faster than gas, so the liquid level may be determined.

In the event of hazardous carbon monoxide or combustible gas levels an audio and/or visual alarm may be created. If not corrected within a reasonable period, the visual alert is ceased and the audio alert operated in a pulsatile manner, in order to conserve the battery. To indicate a low propane tank level, a differentiated audio alert, such as a mild chirp, may be sounded.

It is therefore an object of the invention to provide a hydrocarbon gas detector for use in unprotected environments having a low power consumption and being suitable for extended, low maintenance, battery operation.

It is a further object of the invention to provide an electronic safety and control system for a barbecue or grill which enhances the functionality and safety thereof.

These and other objects will become apparent from a review of the detailed description of the invention.

BRIEF DESCRIPTION OF THE DRAWINGS

The invention will now be described with respect to the drawings, in which.

DETAILED DESCRIPTION OF THE PREFERRED EMBODIMENTS

Figure 1:
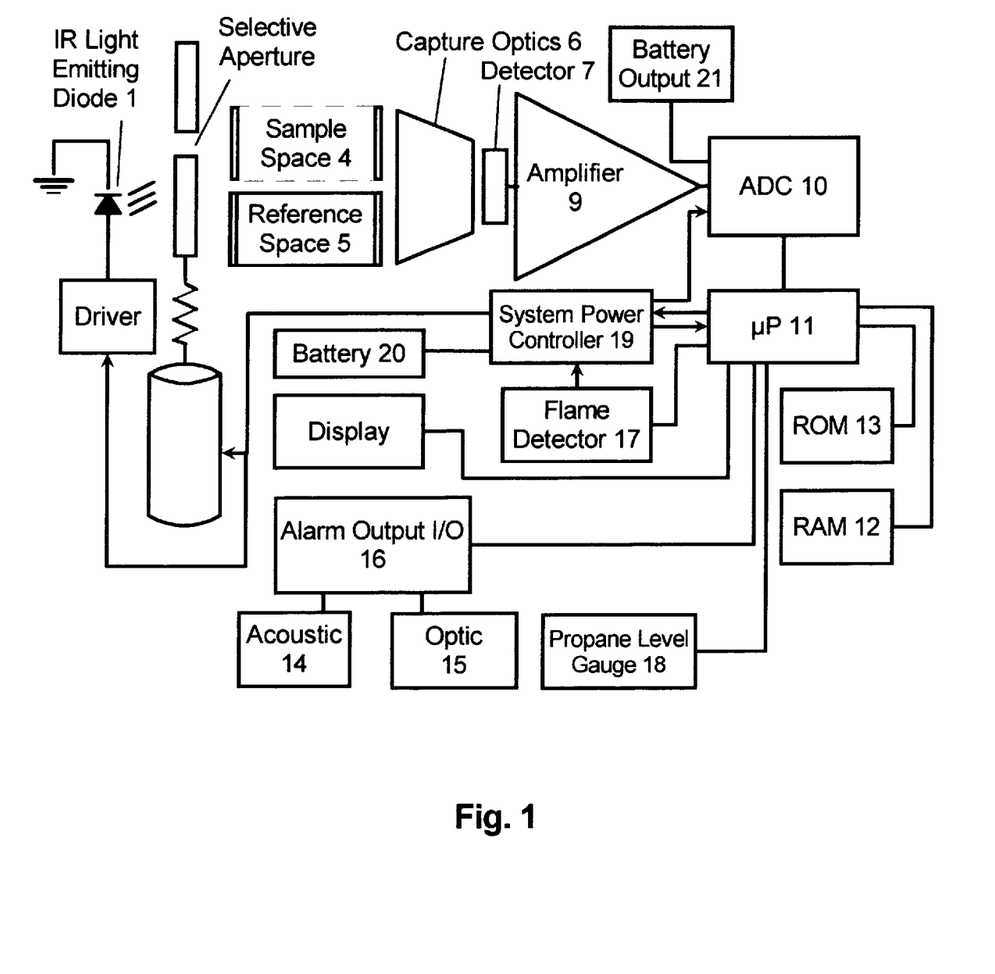
FIG. 1 is a block diagram of a first embodiment of a hydrocarbon gas sensing system.

FIG. 1 shows a schematic drawing of an electronic device for detecting a hydrocarbon gas. An infrared diode 1 produces an output at about 1425 $cm^{-1}$, which selectively passes through an aperture 2 of an open cuvette 3 containing sample gas 4 or a closed cuvette containing a reference gas 5, which, for example, has propane at 25% of the lower explosive limit (LEL). After the optical absorption of one gas 4, 5 is measured, the aperture 2 switches to the other position under power of a small solenoid 8, and the optical absorption of the other gas 5, 4 is measured. The sensor 7 is a silicon photodiode, which is sensitive in the range of approximately 1200–1500 $cm^{-1}$, which receives light from both samples 4, 5, concentrated through a high infrared absorption wedge 6. The output of the photodiode sensor 7 is amplified by an amplifier 9 and digitized to 8–12 bits precision by an analog-to-digital converter 10. A microprocessor 11 receives the digitized signal, and processes it, using data stored in volatile (RAM) 12 and non-volatile (ROM) 13 memory, to allow a comparison with a normalized alarm threshold. An adaptive algorithm may be used, employing parameters stored in volatile memory (RAM) 12 or other writable memory. In event of an alarm condition, an audible 14 and visual 15 alarm is generated, through a driver circuit 16. The system also includes a flame detector 17, which may be used to alter detection thresholds, and a propane tank level detector 18.

The microcontroller program is stored in read only memory (ROM) 13. The microcontroller 11 executes the program using temporary storage in registers and random access memory (RAM) 12. Sensor calibration data, as well as environmental factors and data about the propane tank may be persistently stored and updated in writable memory, for example RAM 13 or EEPROM (not shown). The microcontroller 11 preferably has an integral 10 bit analog to digital converter (ADC) for reading sensor signals, and thus the microcontroller 11 and analog-to digital converter 10 are integral. The analog-to-digital converter may also be used to detect battery 20 condition through battery output 21.

A system power controller 19 carefully limits power consumption of the device to prolong battery 20 life. Thus, hydrocarbon gas measurements may be taken every minute by powering up the sensor (e.g., the light emitting diode 1, solenoid 8, detector 7 and amplifier 9) for 1 mS for each of two measurements, between which the system remains in a sleep mode.

The system preferably employs a sensor duty cycle of less than about 25%, and more preferably less than about 5%, and still more preferably less than about 1%. As is understood, the lower the duty cycle, the lower the power consumption.

The electronic device is battery 20 powered, and is preferably intrinsically safe, meaning that, even with a fault condition, it will not be capable of igniting a combustible gas in the environment. This intrinsic safety is achieved by the avoidance of energy storage elements configured to provide spark energy to ignite a flame, and through the use of flame arrestors (not shown).

Figure 2:
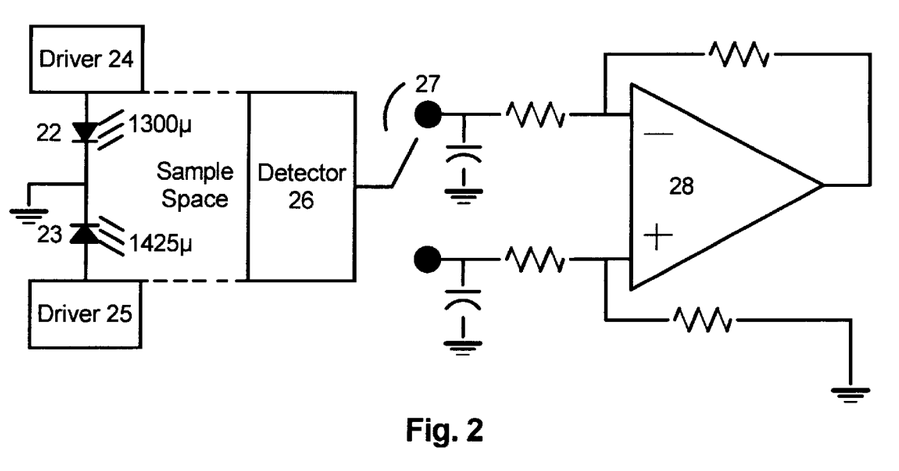
FIG. 2 is a schematic diagram of a second embodiment of a hydrocarbon gas sensing system.

As shown in FIG. 2, the optical sensor may vary, for example, including two infrared light emitting diodes 22, 23 with slightly differing wavelengths, e.g., 1300 cm$^{-1}$ and 1425 cm$^{-1}$, each separately driven by drivers 24, 25. These wavelengths correspond to a peak absorption and adjacent low absorption region for hydrocarbons. The output of the photodiode detector 26 is converted into a differential signal by circuit 27, in the manner of a correlated double sampling circuit, by amplifier 28 and processed as in the system described with respect to FIG. 1, e.g., by an analog-to digital converter 10.

Figure 3:
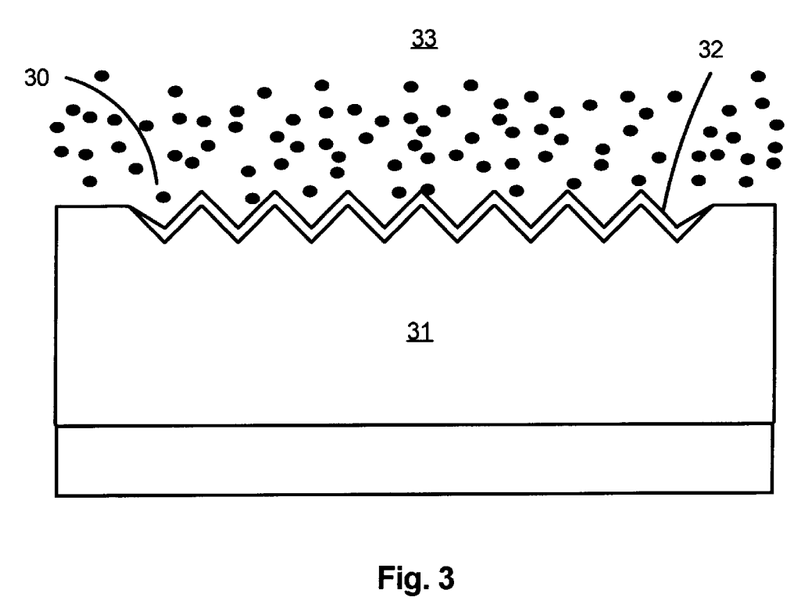
FIG. 3 is a schematic representaition of a Fabry-Perot grating laser diode hydrocarbon sensor embodiment.

FIG. 3 shows yet another embodiment of an optical sensor. In this case, a Fabry-Perot grating 30 on the surface of a 1425 cm$^{-1}$ laser diode 31, which is coated with a material which selectively absorbs hydrocarbons 32. The presence of the concentrated hydrocarbons 33 in this surface layer 32 reduces the reflection efficiency of the reflection grating 30 and thus increases the lasing threshold of the laser diode 31. This threshold is measured by a dynamic analysis of the startup transient.

Figure 4:
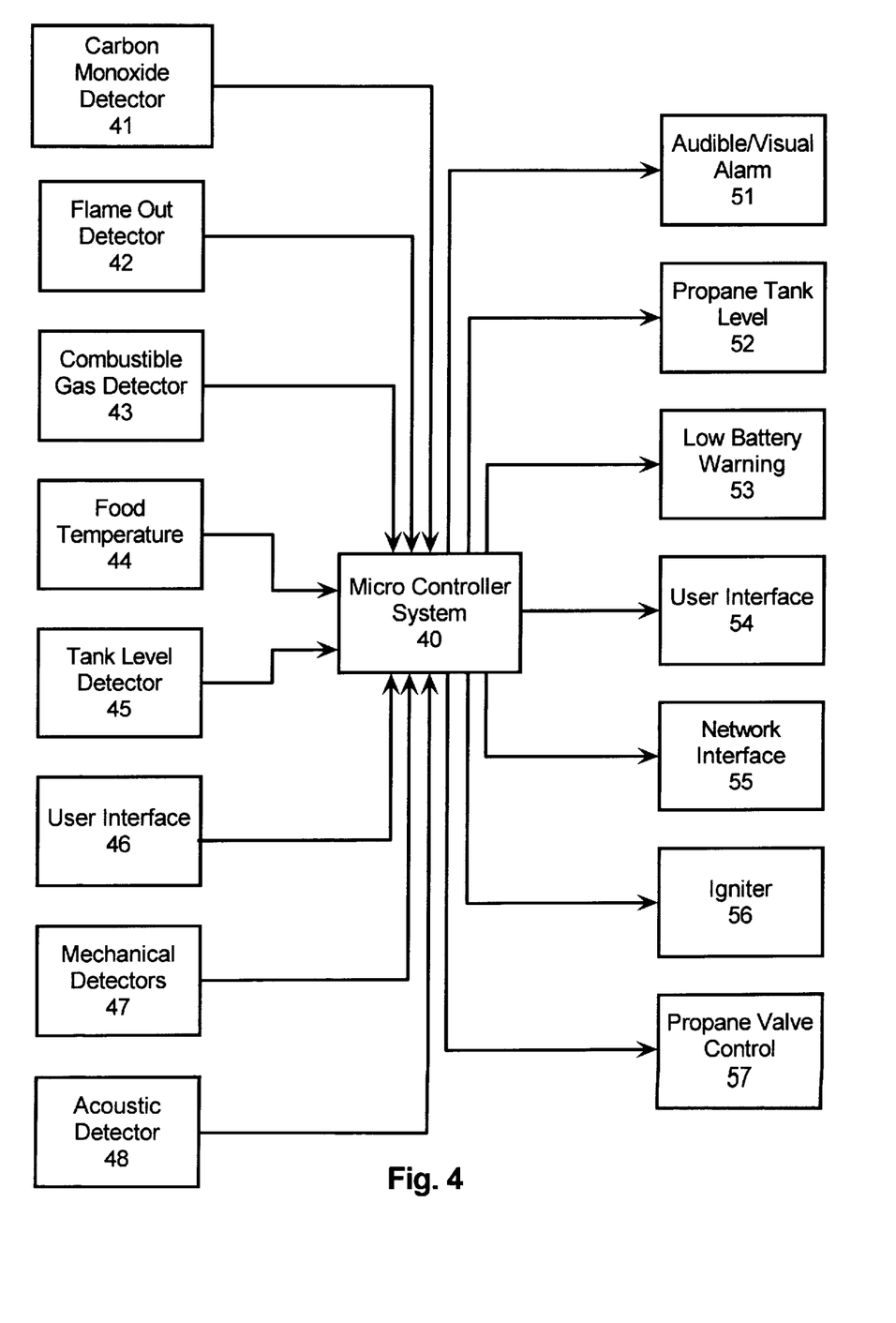
FIG. 4 shows a schematic diagram of the microcontroller system according to the present invention.

FIG. 4 shows a schematic diagram of a microcontroller based system 40 which provides functionality and safety features for a barbecue or grill.

The system provides a combustible gas sensor system 43 and a carbon monoxide sensor system 41, which detect potentially hazardous levels of these gases, as described above. In the event of hazardous levels, an audible and/or visual alarm 51 is generated, under control of the microcontroller based system 40. A flame out detector 42 is also provided, which may also be used to generate an audible and/or visual alarm 51, or alternately used to trigger a relight of the flame by an igniter 56. The flame out detector 42 may also be used to alter an operational mode of the microcontroller based system 40, for example, altering alarm levels of the gas detectors 41, 43.

Advantageously, a tank propane level detector 45 provides an input to the microcontroller based system 40, in order to alert the user to low fuel level. An acoustic detector 48 senses the turbulent flow of propane in the tank valve, tubing and burner (not shown) and may be used to detect whether the barbecue or grill is "on". Mechanical detectors 47 are also provided, which for example detect the position of controls, such as propane control valves. The propane controls may be electronic, with electromechanical valves or the like employed to directly control propane flow based on the mechanical detectors 47 or other user interface elements 46, or in response to a control signal from the microcontroller based system 40.

A food temperature sensor 44 system may be provided to monitor or control the cooking process. Barbecues and grills are often subject to uneven cooking and subjective control over food preparations By measuring food temperature with a food temperature sensor 44, the cooking temperature may be monitored and/or controlled, to optimize the time and/or temperature of cooking. For example, a "rare" steak will optimally be cooked at a higher temperature for a shorter time than a "well done" steak, with the optimal core temperature at readiness of the "rare" steak below the optimum level of the "well done" steak. Thus, the temperature-depth profile is controlled. This profile may be controlled by a multisegment temperature sensor, or based on various inferences, such as starting temperature, food configuration, food density, and grill characteristics and settings. Various foods, such as shellfish, fowl, pork, lamb and beef, as well as vegetables, breads, and the like, have differing optimal cooking temperatures, while the food configuration will also influence the optimal time and temperature profile with respect to depth. Therefore, in conjunction with the food temperature sensor 44, the microcontroller based system 40 can control the propane flow rate with the propane valve control 57. At the determined end of food preparation, the microcontroller based system 40 can turn off the propane to all or a portion of the grill, and/or alert the chef by means of the audible and/or visual alarm 51, user interface 54, through the network interface 55 to other types of computing devices, or the like.

While the food temperature sensors 44 may be typical wired sensors, such as thermistors, thermocouples, semiconductors, or the like, these sensors may also be wireless encoded sensors, such as passive surface acoustic wave sensors or encoded semiconductor sensors. Therefore, a radio frequency interrogation system (typically a 900 MHz ISM band RF-ID system, not shown) may pole the individual sensors to determine food temperature of different pieces or portions of pieces. Since, in this case, the food temperature sensors 44 are wireless, they will not interfere with cooking or handling. Typically, these sensors will be reusable, although disposable designs are possible. It is also possible to estimate cooking by analyzing an infrared image of the top of the food, which will be cooler than the bottom, cooking surface, and generally the same or somewhat higher than the core temperature, due to heat convection. Therefore, an infrared heat sensor or imager may be provided for this purpose.

Since the microcontroller based system 40 is typically battery operated, a low battery warning 53 is provided. Additionally, the propane tank level may be indicated with a special propane tank level output 52, and/or communicated through the user interface 54 or network interface 55.

The network interface 55 is preferably a 900 MHz wireless communication system, and is preferably integrated with a wireless radio frequency interrogation system for the food temperature sensors 44, operating in the same frequency band. The communications protocol is preferably TCP/IP, using hypertext transport protocol (http). TCP/IP is a packet switched telecommunications protocol, thereby allowing multiple devices to simultaneously communicate through the same channel with addressed data packets. The microcontroller based system 40 preferably acts as an embedded web server, communicating information through the wireless link and responding to commands and requests for information. In this case, the user interface (input) 46 and user interface (output) 54 may be virtualized or remote from the microcontroller based system itself, and permit remote monitoring and alarm indication. By employing a standard type communications system, interoperability with separate systems is enhanced. In order to reduce power consumption, the wireless communication system may enter a low power mode when the barbecue or grill is not in operation, for example broadcasting status and alarm conditions, and otherwise being responsive to external systems, every five minutes, and otherwise being inoperative. When the barbecue or grill is in operation, the communications system is fully operative, to provide short communications latencies. An external communication may be used to fully activate the communications system and network interface 55.

The network interface 55 communicates wirelessly with a base station, which may be, for example, integrated with a home network system, alarm monitoring system, or computer system. This base station need not be dedicated to the microcontroller based system 40, and thus may be a generic wireless network device. In order to power the microcontroller based system 40 during barbecue or grill use, a thermoelectric converter may be provided to convert a portion of the heat energy into electricity, using the thermoelectric (Seebeck) effect. Alternately, a fuel cell may be employed to extract hydrogen from the propane (e.g., during partial combustion) to obtain electric power.

There has thus been shown and described barbecue and grill electronic enhancement and safety systems, including environmentally robust propane and hydrocarbon detectors adapted for battery operation over extended periods, and methods which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An electronic control system, comprising:
   (a) a microcontroller;
   (b) a telecommunications network interface, controlled by said microcontroller; and
   (c) a condition detector, producing an output received by said microcontroller;
   said telecommunications network interface having a low latency communications mode and a high latency communications mode, wherein said communications mode is controlled by said microcontroller.

2. The electronic control system according to claim 1, further comprising:
   a user input, for receiving a user desired end cooking state;
   said detector being a food temperature sensor; and
   a combustible cooking fuel combustion rate output;
   wherein said microcontroller proportionally controls said combustible cooking fuel combustion rate output responsive to said input from said food temperature sensor and said user input, and produces a cooking complete signal when said desired end cooking state is achieved.

3. The control system according to claim 1, further comprising a combustible gas detector, for detecting a presence of combustible gasses, providing an input to said microcontroller, said microcontroller producing an alert in an event of combustible gasses exceeding a threshold.

4. The control system according to claim 3, wherein said combustible gas detector comprises:
   (a) an electro-optic device emitting photons at a wavelength which selective interacts with a hydrocarbon as compared to air, associated with a detector for detecting the selective interaction; and
   (b) an alarm monitor for receiving an output of said detector when said electro-optic device is activated and determining a relationship of a detected hydrocarbon level and a predetermined value.

5. The control system according to claim 1, further comprising a partial combustion product detector, for detecting a presence of gaseous partial combustion products.

6. The control system according to claim 2, wherein said food temperature sensor provides said input to said microcontroller wirelessly.

7. The control system according to claim 2, wherein said food temperature sensor determines a temperature of at least two portions of the food.

8. The control system according to claim 2, further comprising a remote user interface communicating through the telecommunications network interface wirelessly.

9. The control system according to claim 2, further comprising a proportional fuel control valve.

10. The control system according to claim 1, wherein the telecommunications network interface comprises a wireless switched packet network communicating with a remote terminal.

11. The control system according to claim 1, wherein said telecommunications network interface communicates with a packet switched communications network.

12. The control system according to claim 1, wherein said condition detector is selected from one or more of the group consisting of a combustible gas detector and a toxic gas detector.

13. The control system according to claim 1, wherein said detector comprises an optical hydrocarbon detector.

14. The control system according to claim 12, wherein said detector operates intermittently.

15. The control system according to claim 1, further comprising a food temperature sensor.

16. The control system according to claim 15, wherein said food temperature sensor operates wirelessly.

17. The control system according to claim 1, further comprising a combustible fuel remaining input to said microcontroller.

18. The control system according to claim 1, wherein said detector is associated with a propane grill.

19. The electronic control system according to claim 1, wherein said detector comprises:
   (a) an electro-optic device emitting photons at a wavelength which selective interacts with a hydrocarbon as compared to air, associated with a detector for detecting the selective interaction;
   (b) a system power controller to activate said electro-optic device intermittently at a duty cycle of less than about 25%; and
   (c) an alarm monitor for receiving an output of said detector when said electro-optic device is activated and determining a relationship of a detected hydrocarbon level and a predetermined value.

20. The control system according to claim 19, wherein said electro-optic device comprises an infrared light emitting diode device.

* * * * *